Patented Sept. 1, 1936

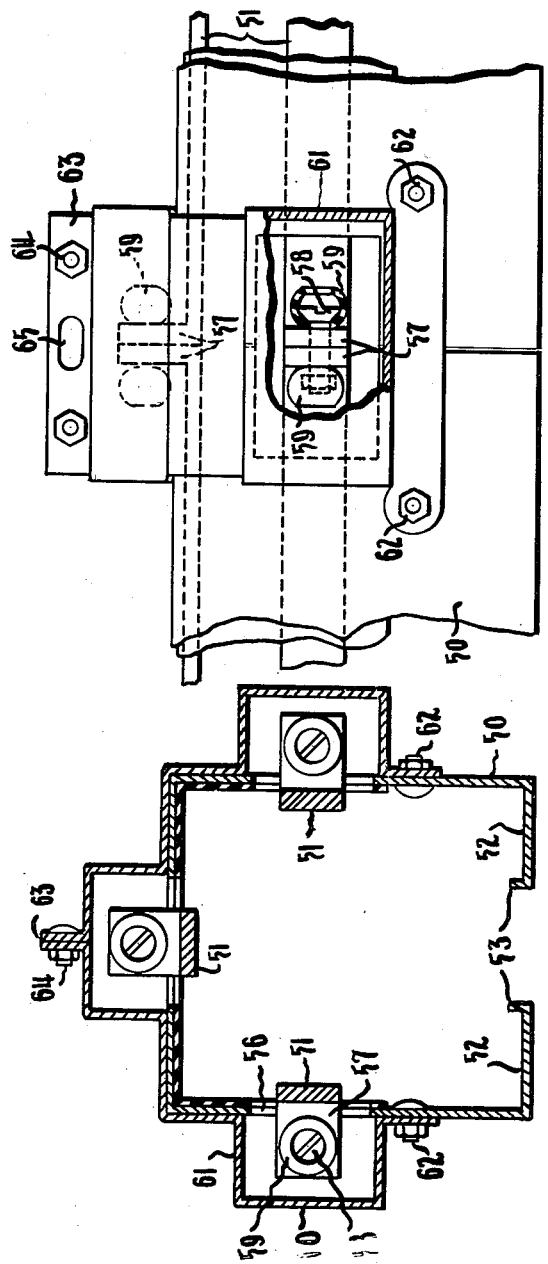

2,052,972

UNITED STATES PATENT OFFICE 2,052,972

TROLLEY DUCT

Harrison J. L. Frank and William A. Harper, Detroit, Mich.

Application May 6, 1935, Serial No. 20,113

7 Claims. (Cl. 247—3)

This invention relates to trolley duct, and more particularly to splicing means of the same.

Objects of the invention will be readily apparent upon reference to the following detailed descriptive matter relating to the appended drawing.

Referring to this drawing it will be seen that Figs. 1 and 2 show in end and side view details of a bus duct splice.

Figs. 1-2 show a bus duct 50 having bus bars 51, and rail portions 52 between which is a continuous slot having flanged edges 53. The duct is made of sections and Figs. 1-2 show a novel splicing arrangement for the duct.

As can readily be seen from Figs. 1 and 2, the side walls of the duct 50 at the ends of duct sections are provided with end slots which register to form openings 56 through which project bent-up ends or lugs 57 of adjacent bus bar sections 51, and these ends of adjacent bus bar sections are interconnected and pulled together by means of screws 58 whose heads and nuts are covered by insulation sealing cups 59 filled with sealing wax. For covering the openings 56 in the duct, there are provided covering plates 60 having bent out portions 61 which clear the ends 57, and these covering plates form splices between duct sections, the covering plates being bolted to duct section ends by bolts 62. The covering plates are continued upwardly above the duct to provide flanges 63 by means of which they may be joined to each other by bolts 64, and also by means of which the duct as a whole may be hung with respect to fixed structure, the hangers passing through holes 65 in the flanges.

We claim:

1. A sectional trolley bus duct construction having adjacent ends of duct sections notched in registry to form an opening, sections of bus bars in the duct sections, adjacent bus bar section ends having lugs projecting through said opening to present portions outside the duct, means outside the duct securing the lugs to each other, and a plate splicing the duct section ends to each other and covering the opening and the lugs.

2. A sectional trolley bus duct construction having adjacent ends of duct sections notched in registry to form an opening, sections of bus bars in the duct sections, adjacent bus bar section ends having lugs projecting through said opening to present portions outside the duct, means outside the duct securing the lugs to each other, and a plate splicing the duct section ends to each other and having a box portion covering the opening and the lugs.

3. A sectional trolley bus duct construction having openings in duct sides, near the duct section ends to be spliced, sections of bus bars within the duct sections, adjacent bus bar section ends having lugs projecting therefrom to well outside the duct through the openings, and means outside the duct connecting the lugs to one another and thus splicing the bus bar sections to one another.

4. A sectional trolley bus duct construction having openings in duct sides, near the duct section ends to be spliced, sections of bus bars within the duct sections, adjacent bus bar section ends having lugs projecting therefrom to well outside the duct through the openings, and means outside the duct connecting the lugs to one another physically and electrically and thus splicing the bus bar sections to one another.

5. A sectional trolley bus duct construction having openings in duct sides, near the duct section ends to be spliced, sections of bus bars within the duct sections, adjacent bus bar section ends having lugs projecting therefrom to well outside the duct through the openings, and means outside the duct connecting the lugs to one another so that they are in close proximity and thus splicing the bus bar sections to one another.

6. A sectional trolley bus duct construction having openings in duct sides, near the duct section ends to be spliced, sections of bus bars within the duct sections, adjacent bus bar section ends having lugs projecting therefrom to well outside the duct through the openings, and means outside the duct connecting the lugs to one another so that they are in close proximity to avoid interrupting the continuity of the bus rail and thus splicing the bus bar sections to one another.

7. A construction of the character described in claim 3 wherein the openings comprise registering notches in adjacent ends of duct sections.

HARRISON J. L. FRANK.
WILLIAM A. HARPER.